United States Patent
Lachenit et al.

(10) Patent No.: US 7,598,884 B2
(45) Date of Patent: Oct. 6, 2009

(54) SEISMIC WARNING SYSTEM

(76) Inventors: Heinz Lachenit, Albert-Enstein-Weg 24, Olfen (DE) 59399; Jurgen Przybylak, Borghagener Str. 145, Castrop-Rauxel (DE) 44581; Ralf-Dieter Schultz, Knappenwag 20, Castrop-Rauxel (DE) 44581

( * ) Notice: Subject to any disclaimer, the term of this patent is extended or adjusted under 35 U.S.C. 154(b) by 0 days.

(21) Appl. No.: 11/753,202

(22) Filed: May 24, 2007

(65) Prior Publication Data
US 2007/0279239 A1 Dec. 6, 2007

Related U.S. Application Data

(63) Continuation of application No. PCT/EP2005/012537, filed on Nov. 23, 2005.

(30) Foreign Application Priority Data
Nov. 25, 2004 (DE) .......................... 202004018276

(51) Int. Cl.
  G04B 21/00 (2006.01)
  G01V 1/00 (2006.01)
(52) U.S. Cl. .................. 340/690; 340/286.02; 340/507; 340/508; 702/15; 367/14
(58) Field of Classification Search ................. 340/690, 340/522, 689, 683, 665, 669, 539.26, 286.02, 340/506–508; 367/14, 20, 21, 36–38; 702/14–18
See application file for complete search history.

(56) References Cited

U.S. PATENT DOCUMENTS

| | | | |
|---|---|---|---|
| 4,408,196 A * | 10/1983 | Freeman | 340/690 |
| 5,783,945 A | 7/1998 | Balbachan et al. | |
| 5,910,763 A * | 6/1999 | Flanagan | 340/286.02 |
| 6,356,204 B1 * | 3/2002 | Guindi et al. | 340/690 |
| 6,930,596 B2 * | 8/2005 | Kulesz et al. | 340/506 |
| 7,005,993 B2 * | 2/2006 | Webb et al. | 340/601 |
| 2005/0251343 A1 * | 11/2005 | Zehavi | 702/18 |

FOREIGN PATENT DOCUMENTS

| | | |
|---|---|---|
| JP | 2000253467 A | 9/2000 |
| WO | WO 99/09433 A | 2/1999 |
| WO | WO 2004/021298 A | 3/2004 |

OTHER PUBLICATIONS

Di Stefano A. et al., A Multi-DSP Based Monitoring Station For Realtime Detection And Evaluation Of Earthquakes, Conference Proceedings Article, May 20, 1990, 41.
Agre J. R. et al., Development Platform For Self-Organizing Wireless Sensor Networks, Proceedings of the Spie, Aug. 31, 1999, 257-268.

* cited by examiner

Primary Examiner—Davetta W Goins
Assistant Examiner—Anne V Lai
(74) Attorney, Agent, or Firm—Slston & Bird LLP (57) ABSTRACT

The invention relates to a seismic warning system comprising of two or more sensors for detecting shock signals and electronic signal processing elements for processing and analyzing said signals. According to the invention, the system has at least two detection units, each comprising a shock sensor and electronic signal processing elements. The signal processing elements of each detection unit are configured in such a way that they detect the primary waves of earthquakes using the signals of the shock sensors. The detection units are interconnected via an electronic data bus.

12 Claims, 4 Drawing Sheets

SEISMIC WARNING SYSTEM

CROSS-REFERENCE TO RELATED APPLICATIONS

This application is a continuation of PCT/EP2005/012537, filed Nov. 23, 2005, which claims priority from Germany Application No. 20 2004 018276.9, filed Nov. 25, 2004, all of which are hereby incorporated herein by reference.

BACKGROUND OF THE INVENTION

The invention relates to an earthquake alert system having two or more sensors for detecting tremor signals, and having means for electrical signal processing for processing and analyzing the tremor signals.

It is known that the fact that shock waves spread out through the earth's crust in a characteristic manner can be utilized to detect immediately imminent earthquakes. Different types of waves spread out in all directions from the epicenter of an earthquake. In this connection, a differentiation is made between primary waves (abbreviation: P waves), and secondary waves (abbreviation: S waves). The P waves are compression waves that spread at a clearly greater velocity than the S waves. The S waves are shear waves, which have a significantly greater amplitude than the P waves. The destruction that occurs during earthquakes is caused exclusively by the S waves.

The P waves, which have not only a lower amplitude but also a different vibration spectrum than the S waves, do not cause any destruction and are generally not even perceived by humans. Because of the greater velocity of spread of the P waves, these arrive at a location distant from the epicenter of the earthquake sooner than the destructive S waves. Therefore, the detection of P waves can be utilized to generate an alert before the S wave arrives. The early warning time, in other words the time span between arrival of the P wave and the arrival of the subsequent S wave, depends primarily on the distance from the epicenter of the earthquake.

It is furthermore known that there are relationships between the characteristics of the P waves and the S waves of an earthquake, on the basis of geophysical laws. For this reason, the amplitude of the subsequent S wave and therefore the destructive effect can be predicted or at least estimated from the spectrum and the amplitude of a P wave that is detected.

Every year, seismologists record approximately 20,000 earthquakes. Millions of people live in areas that are at risk of earthquakes. Despite improved earthquake-proof methods of construction, people are always injured or killed in severe earthquakes. This is particularly due to the fact that these people are in buildings that collapse due to the tremors, at the time that the S wave of the earthquake arrives. The great numbers of victims of severe earthquakes are furthermore attributable, to a significant proportion, to fires that are caused by gas lines that ruptured during the earthquake and/or damaged power lines.

It is immediately evident that there is an urgent need for reliably functioning earthquake alert systems. Using such earthquake alert systems, people are supposed to be given the opportunity to leave buildings, or at least go to safe areas within buildings, when a potentially hazardous earthquake is immediately imminent. Modem earthquake warning systems that are able to detect a P wave of an earthquake are suitable for giving an alarm with a sufficient early warning time so that the numbers of victims of severe earthquakes can be significantly reduced.

An earthquake alert system of the type stated initially is known, for example, from WO 99/09433 A1. The previously known system is suitable for detecting upcoming earthquakes, in that the P wave that precedes a potentially destructive S wave of an earthquake is recorded and analyzed, by means of suitable tremor sensors and signal processing means. It is known that sensitive tremor sensors are required for reliable detection of P waves of an earthquake. Because of the required great sensitivity, earthquake warning devices whose function is based on the detection of P waves are susceptible to false alarms. Consequently, there is a conflict of goals, which is difficult to resolve, between reliable and sufficient detection of P waves, on the one hand, and equally reliable avoidance of false alarms, on the other hand. Particularly in the case of earthquake alert systems whose tremor sensors are affixed to buildings in the vicinity of roads and railroad lines, there is the problem that ground vibrations caused by road or railroad traffic are difficult to differentiate from P waves of an earthquake. In order to solve this problem, the aforementioned WO 99/09433 A1 proposes to affix a plurality of tremor sensors at different locations of a building. The tremor signals detected by the individual sensors are transmitted to a central signal processing device of the previously known earthquake alert system by way of suitable (including wireless) transmission lines. This central signal processing device evaluates the tremor signals that arrive from the various sensors. If it is determined, in the analysis of the tremor signals, that two or more sensors for P waves have detected characteristic tremor signals with a time overlap, an alarm is triggered. In other words, in the case of the previously known earthquake alert system, an attempt is made to avoid false alarms in that an alarm is triggered only if P waves are recorded, in agreement, in tremor sensors that are affixed at different locations. In this way, it is effectively avoided that a locally occurring ground vibration that is triggered by a heavy vehicle passing by, for example, is recorded as a P wave of an earthquake and results in an alarm being triggered. In order to ensure that a reliable distinction can be made between P waves of an earthquake and normal, unimportant ground vibrations, without having to accept restrictions with regard to the sensitivity of the earthquake alert system, the aforementioned WO 99/09433 A1 furthermore proposes to store natural tremor patterns typical for the location in a data memory of the central processing unit. In the case of the previously known system, an alarm is given only if tremors whose spectrum deviates from the stored spectrum are recorded. In the case of the previously known earthquake alert system, it is a disadvantage that it is not very flexible in use. Another disadvantage is that the function of the previously known system is impaired, as a whole, if only partial components of the system fail.

The previously known system consists, as already explained, of a central signal processing unit to which a plurality of sensors can be connected. The central processing unit has a separate input connection for every tremor sensor that can be connected. It is therefore disadvantageous that the number of sensors that can be connected is maximally equal to the input connectors present on the central signal processing unit. Accordingly, the previously known system can only be expanded within certain limits. However, it is particularly problematical that the function of the previously known system is restricted if even only a few of the sensors fail. Since the functions that are essential for giving an alarm are brought together in the central signal processing unit, the earthquake alert system as a whole is put out of operation in case of a defect of the central processing system. Due to a lack of redundancy, the reliability of the previously known system and therefore the safety with regard to an earthquake alert is not satisfactory.

Proceeding from this, it is the task of the invention to make available an earthquake alert system that is flexible in use. In this connection, it is supposed to be possible to monitor very different types of constructions (e.g. buildings, bridges, tunnels, roads, sewer systems, etc.) with the lowest possible expenditure of costs.

Furthermore, a redundant and therefore reliable and safe earthquake alert is supposed to be made possible.

BRIEF SUMMARY OF THE INVENTION

This task is accomplished by the invention, proceeding from an earthquake alert system of the type stated initially, in that the system comprises at least two detection units that each have a tremor sensor and electronic signal processing means, in each instance, whereby the signal processing means of each detection unit are set up in such a manner that they detect primary waves of earthquakes on the basis of the signal of the tremor sensor, and whereby the detection unit are connected with one another by way of an electronic data bus. The invention is based on the recognition that a reliably functioning and thereby safe earthquake alert system can be created if it is structured by means of two or more functionally reliable detection units that are separate and independent of one another. A significant difference of the system according to the invention as compared with the state of the art specifically consists in the fact that each of the two or more detection units has at least one tremor sensor as well as its own electronic signal processing means for processing and analyzing the ground tremor signals recorded by the tremor sensor, in each instance, assigned to it, in each instance. In this way, each detection unit is able to detect P waves of potentially hazardous earthquakes. The desired redundancy results from the fact that the individual detection units of the system according to the invention are connected with one another by way of an electronic data bus. The detection units can communicate with one another via this data bus, so that it can be determined, for example, whether two or more of the detection units have agreed in detecting a P wave. In the case of the earthquake alert system according to the invention, triggering of an alarm can be made dependent on this, particularly in order to avoid false alarms. A significant advantage of the earthquake alert system according to the invention is that it can be expanded and scaled as desired. A reliable earthquake alert, resistant to false alarms, is already possible by means of only two detection units. By adding additional detection units, the safety can be increased, so that even if individual detection units fail, sufficient reliability is still guaranteed. Furthermore, scalability is advantageous if a step-by-step structure of the earthquake alert system is desired in large buildings or building complexes.

The modular structure of the earthquake alert system according to the invention furthermore has the advantage that any desired type of buildings and building complexes can be monitored by means of standardized detection units that are connected with one another by way of the electronic data bus, inexpensively and, at the same time, with a high degree of safety. It has proven to be particularly practical if characteristic variables are calculated from the tremor signals of primary waves that are detected, by means of the signal processing means of the detection units according to the invention, which variables are a measure of the destructive effect of secondary waves to be expected subsequently. An alarm can then be given as a function of the result of a comparison of the calculated characteristic variables with corresponding threshold values. In the case of the system according to the invention, it is practical if tremor sensors are used to detect acceleration values in three spatial directions. The Corresponding signals can then be calculated into a characteristic variable, taking into consideration the frequency spectrum and weighting the acceleration components detected in the three spatial directions. This number can then be compared, in simple manner, with a threshold value, whereby this threshold value indicates the value from which an S wave that could have destructive effects has to be expected, on the basis of the recorded P wave. According to the invention, therefore, not only is a P wave detected, but it is also assessed. This method of procedure has the advantage, as compared with the systems known from the state of the art, that an alarm will reliably be triggered only if danger is actually a threat. In typical earthquake regions, small earth tremors occur practically every day. Using the system according to the invention, it is possible to avoid constantly and unnecessarily giving an alarm in these regions. Constant false alarms would have the result, within a short period of time, that alarms of the alert system would not be taken seriously. The final result would be a complete lack of acceptance of the system.

The electronic data bus of the system according to the invention can be implemented conventionally, by means of corresponding data lines in the form of cable connections. However, it is also particularly advantageous to implement the data bus as a whole, or at least parts of the corresponding signal transmission paths, by way of wireless connections. Suitable standard components for wireless digital signal transmission are commercially available at low costs nowadays. A wireless data bus makes it possible, in advantageous manner, to install the earthquake alert system according to the invention in cost-effective manner, with the lowest possible expenditure. Particularly if building complexes of several separate buildings are supposed to be monitored, wireless connections are obviously particularly practical.

According to a practical embodiment of the earthquake alert system according to the invention, the detection units communicate in a master/slave mode, specifically in such a manner that a detection unit being operated in the master mode periodically queries the detection units being operated in the slave mode. Accordingly, while the individual detection units operate independent of one another and also perform the analysis of the tremor signals independent of one another, only the detection unit being operated in the master mode brings the results of the signal analyses of the individual detection units being operated in the slave mode together. The detection unit being operated in the master mode can then be set up in such a manner that it activates an alarm, as a function of the result of the query of the detection units being operated in the slave mode. Since the detection unit is being operated in the master mode itself also has a tremor sensor and corresponding electronic signal processing means, its signal analysis result can, of course, also be taken into consideration when giving an alarm. It is practical if the detection units are set up in such a manner that each one of the units connected with one another by way of the data bus can be operated either in the master mode or the slave mode. In particular, it should be assured, by means of suitable programming and configuration, for example, that a detection unit being operated in the slave mode automatically takes on the function of a master as soon as the unit being operated in the master mode fails, or if its connection to the data bus is interrupted. Only in this way can it be guaranteed that the system as a whole always remains functionally reliable.

In order to avoid false alarms, it is practical if the detection unit being operated in the master mode is furthermore set up in such a manner that the alarm is activated only if the signal processing means of at least two detection units detect a primary wave with time correlation. In this manner it is prevented that unimportant local ground vibrations, for example caused by heavy vehicles passing by, result in triggering of a false alarm.

According to an advantageous embodiment of the earthquake alert system according to the invention, the alarm is separate from the detection units. Activation of the alarm then takes place by the detection units, controlled by way of the data bus. This makes it possible to dispose the alarm at a spatial distance from the detection units, in larger buildings or building complexes. The detection units, with the tremor centers contained in them, must be disposed close to the ground, i.e. generally in the basement or in the region of the foundation of a building, in order to detect ground vibrations. Acoustical or optical alarms, however, must be affixed where people are present. In multi-floor buildings, it is necessary for separate acoustical or optical alarms to be present on every floor or even in several rooms of the individual floors, in order to ensure that an earthquake alert is perceived.

It is particularly practical if the modular earthquake alert system according to the invention has at least one building technology unit, connected to the data bus, for controlling at least partial components of the building technology of a building being monitored by means of the earthquake alert system. For example, gas lines, power lines, and also water lines can be blocked or shut off if a primary wave of a potentially hazardous earthquake is detected, by means of the building technology unit. The building technology unit of the earthquake alert system according to the invention can furthermore be utilized to bring elevators into a safe parking position, for example, or also to initiate data backup of the data processing systems located in the buildings in question. Furthermore, the building technology unit can turn on emergency power units, activate emergency lighting and/or automatically open emergency exits and safety exits, if it receives a corresponding signal from the data bus. In industrial plants, the building technology unit of the earthquake alert system can furthermore be utilized to control machines or other production systems, so that personal injury and property damage are avoided as much as possible in the case of an imminent earthquake.

It is furthermore useful, in this connection, if the signal processing means of the detection units are additionally set up in such a manner that they detect secondary waves of earthquakes on the basis of the signals of the tremor sensors, whereby at least partial components of the building technology can be controlled as a function of the detection of secondary waves. It is not practical, to some extent, to shut off the entire building technology as soon as a P wave is detected. Instead, it should be possible to keep certain safety-relevant building functions in operation as long as possible. Accordingly, the possibility exists, with the system according to the invention, to either shut off pre-selectable components of the building technology only when an S wave is detected, or to control them in some other suitable manner. It might also be desirable to control the building technology in time steps, for example to shut off the power only once the elevators of the monitored building have been moved to a safe parking position.

Furthermore, the earthquake alert system according to the invention can have at least one operating unit, connected with the data bus, with operating and display elements for controlling the detection units and for querying and displaying the operating state of the system. A control center of the earthquake alert system according to the invention can be implemented using such operating units, for example at the security desk of a building.

In accordance with the modular concept of the earthquake alert system according to the invention, it can have a power supply unit by means of which the individual components of the system can be provided with electrical power, by way of the data bus or preferably by way of separate lines. In this connection, the power supply unit can, in particular, be a module that is separate from the other components, namely the detection units, the building technology units, as well as the operating units. This makes it possible to situate the individual components of the system, particularly the detection units, in a building to be monitored, in those locations where no power connection is available. The power supply unit itself can be connected directly to a power supply network. For emergency power to the earthquake alert system, it is advantageous if the power supply unit comprises a battery or rechargeable battery.

It is particularly practical if the power supply unit of the earthquake alert system according to the invention has connectors for optical and/or acoustical alarms. These alarms can then be activated by the detection units, by way of the data bus. Suitable alarms, such as flashing lights or sirens, for example, require a comparatively great amount of power. For this reason, it is practical to connect the alarms directly with the power supply unit, since it can make the required electrical power available.

As another expansion stage, there is the possibility of providing a memory unit for continuously recording and storing the ground vibration signals detected by the detection units in the system according to the invention. In this connection, it is furthermore practical to equip the system with a remote data communication unit, in order to allow data communication between spatially remote systems or also with central servers. In this way, regional and even superregional networks of earthquake alert systems can be created, and the constantly available tremor measurement data will be available for scientific purposes.

In the case of earthquakes, the data recorded can be centrally collected and analyzed, in order to effectively coordinate the necessary catastrophe protection and rescue measures on this basis. In regions that are at risk of earthquakes, the regional linking of alert systems is extremely useful, because the effective early warning times can be significantly increased thereby. If P waves are detected at a specific location, alerts can also be generated at other locations that are at risk, within a predetermined surrounding area, and this can be done long before any ground tremors can even be recorded at these locations.

BRIEF DESCRIPTION OF THE DRAWINGS

Exemplary embodiments of the invention will be explained in the following, using the figures. These show.

DETAILED DESCRIPTION OF THE INVENTION

Figure 1:
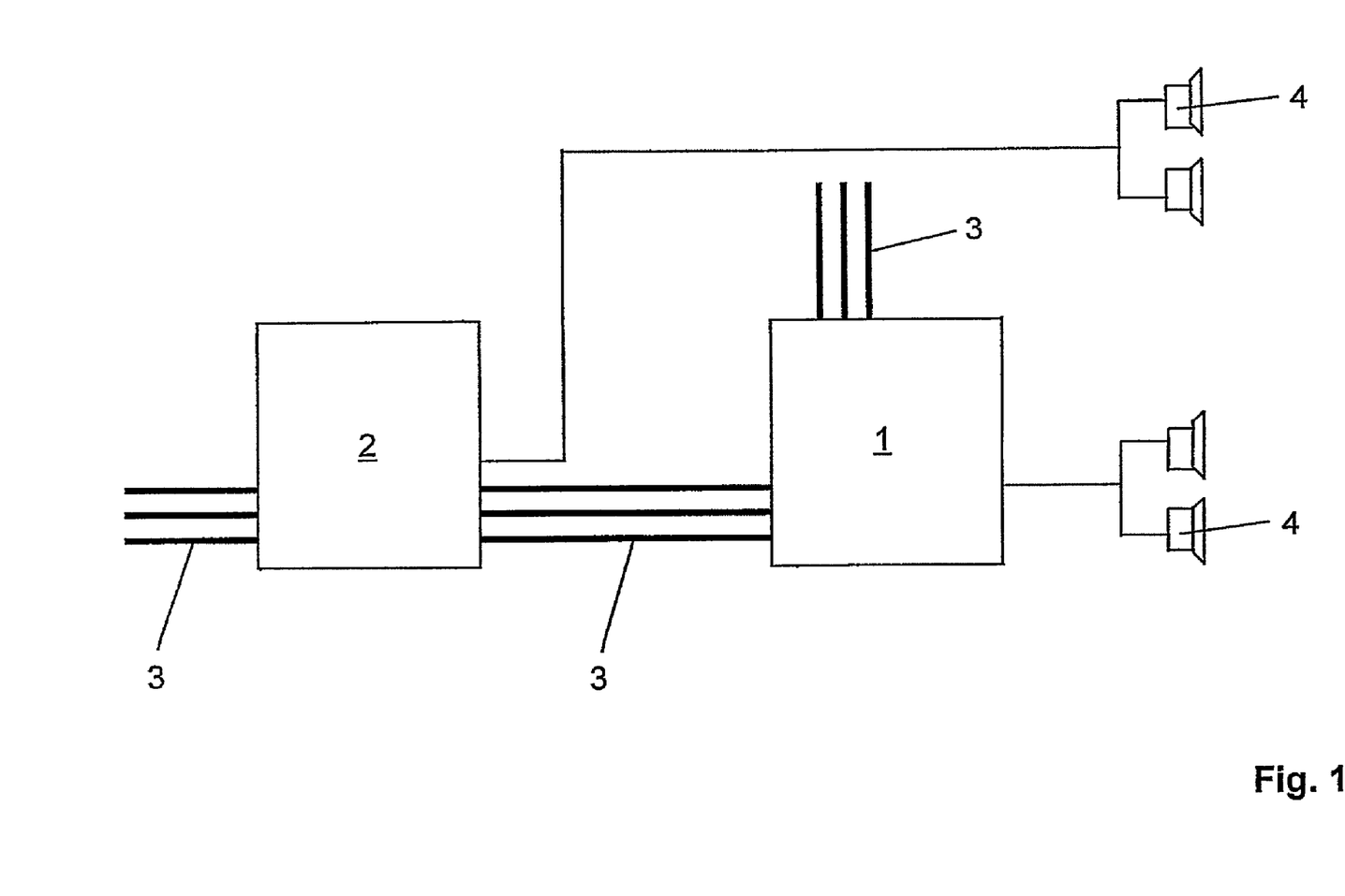
FIG. 1 representation of the earthquake alert system according to the invention, with two detection units, as a block diagram.
Figure 2:
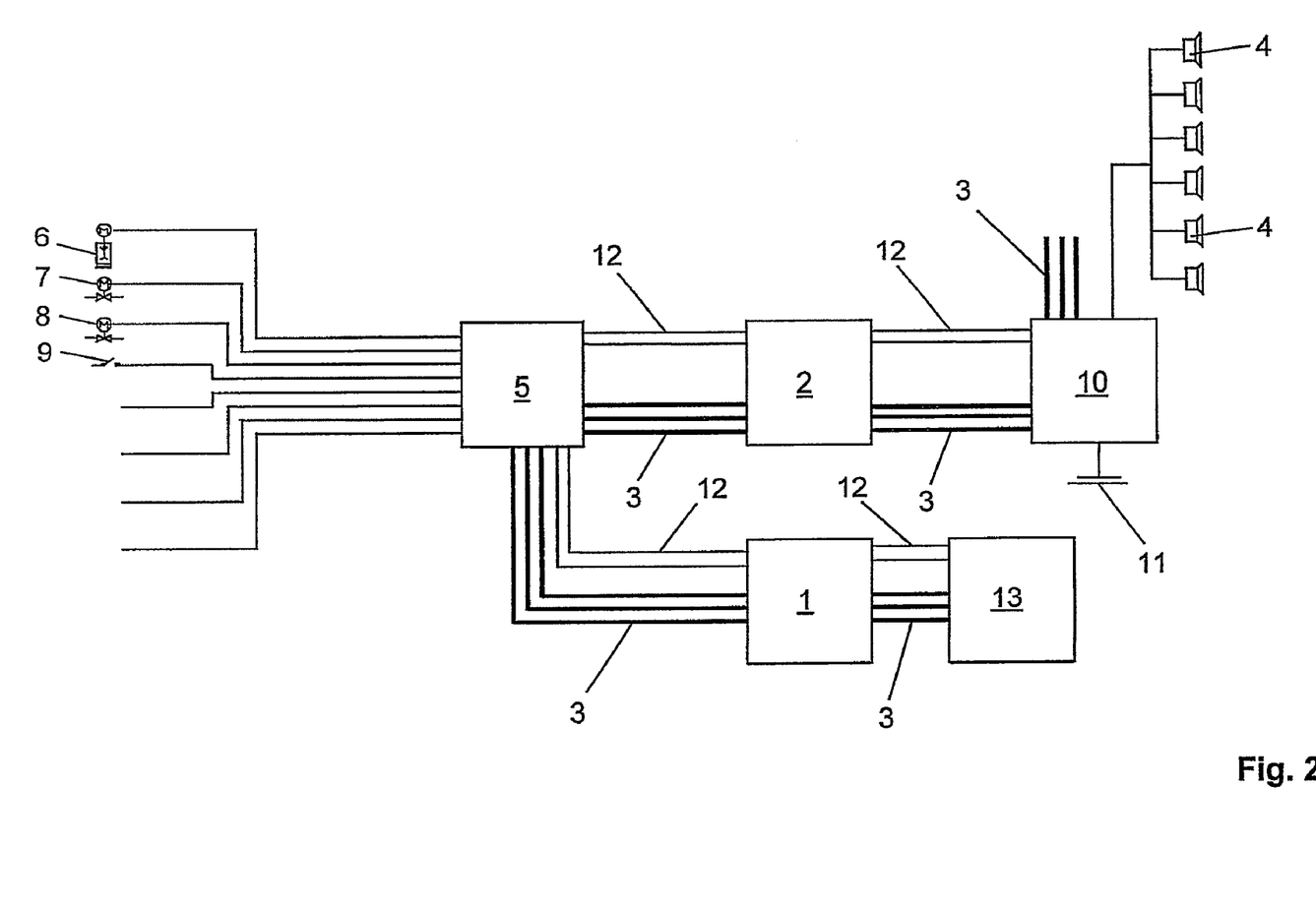
FIG. 2 earthquake alert system according to the invention, with building technology unit.

The earthquake alert system shown in FIG. 1 consists of two detection units 1 and 2, which each have a tremor sensor not shown in the figure, as well as signal processing means, also not shown in the figure, for processing and analyzing the signals of the tremor sensor. The detection units 1 and 2 are connected with one another by way of a data bus 3. Sirens 4 as acoustical alarms are connected with each of the detection units 1 and 2. The signal processing means of the detection units 1 and 2 are set up in such a manner that they detect primary waves of earthquakes on the basis of the signals of the tremor sensors, in each instance. The detection units 1 and 2 communicate with one another in master/slave mode, by way of the data bus 3. In this connection, the detection unit 2, which is being operated in master mode, periodically queries the detection unit 1, which is being operated in slave mode. In this way, the detection unit 2, which is being operated in master mode, receives the information as to whether or not the unit 1, which is being operated in slave mode, has detected the primary wave of an earthquake, by way of the data bus 3. The detection unit 2, which is being operated in master mode, can activate the alarm 4 as a function of the result of this query. To activate the sirens 4 connected with the detection unit 1, which is being operated in slave mode, the detection unit 2 transmits a corresponding command to the detection unit 1 by way of the data bus 3. The detection unit 2, which is being operated in master mode, is set up in such a manner that the sirens 4 are only activated if the signal processing means of both detection units 1 and 2 have detected a primary wave with time correlation, in order to avoid false alarms. FIG. 2 shows a more complex variant of the earthquake alert system according to the invention. In the case of the system shown in FIG. 2, as well, a detection unit 2 being operated in master mode, as well as a detection unit 1 being operated in slave mode, which are connected with one another by way of an electronic data bus 3, are present. In addition, the system shown has a building technology unit 5 that is also connected with the data bus 3. The building technology unit 5 is controlled by the detection unit 2, which is being operated in master mode, by way of the data bus 3. The building technology unit 5 serves to control various components of the building technology of the monitored building. These are an elevator control 6, by means of which an elevator can be moved to a safe parking position, solenoids 7 and 8 for interrupting gas lines and water lines, respectively, in the case of an imminent earthquake, as well as an electrical main switch 9 for interrupting the power supply to the building. A power supply unit 10 serves to supply power to the components of the earthquake alert system shown in FIG. 2; it is connected with a power supply network 11. The power supply unit 10 comprises a network part that generates direct voltage, for example 15 V, from the network voltage, and is available to the individual components of the system by way of a power supply line 12. At the same time, the power supply unit comprises a rechargeable battery, not shown in detail in the figure, so that in case of a power failure, emergency power to the system is guaranteed. The rechargeable battery is constantly kept in the charged state by means of the power supply unit 10. Furthermore, alarm sirens 4 are connected with the power supply unit 10. These alarm sirens, in turn, can be activated by the detection unit 2 that is being operated in master mode, by way of the data bus 3. Because of the great electrical power required, the sirens 4 are directly connected with the power supply unit 10. In the system shown in FIG. 2, finally, an operating unit 13 is also provided. The operating unit 13 has operating and display elements, for example in the form of operating buttons and LCD displays, for controlling the detection units 1, 2, for configuring the building technology unit 5, and for monitoring the operating state of all of the components of the earthquake alert system. The operating unit 13 essentially forms the control and monitoring center of the earthquake alert system.

Figure 3:
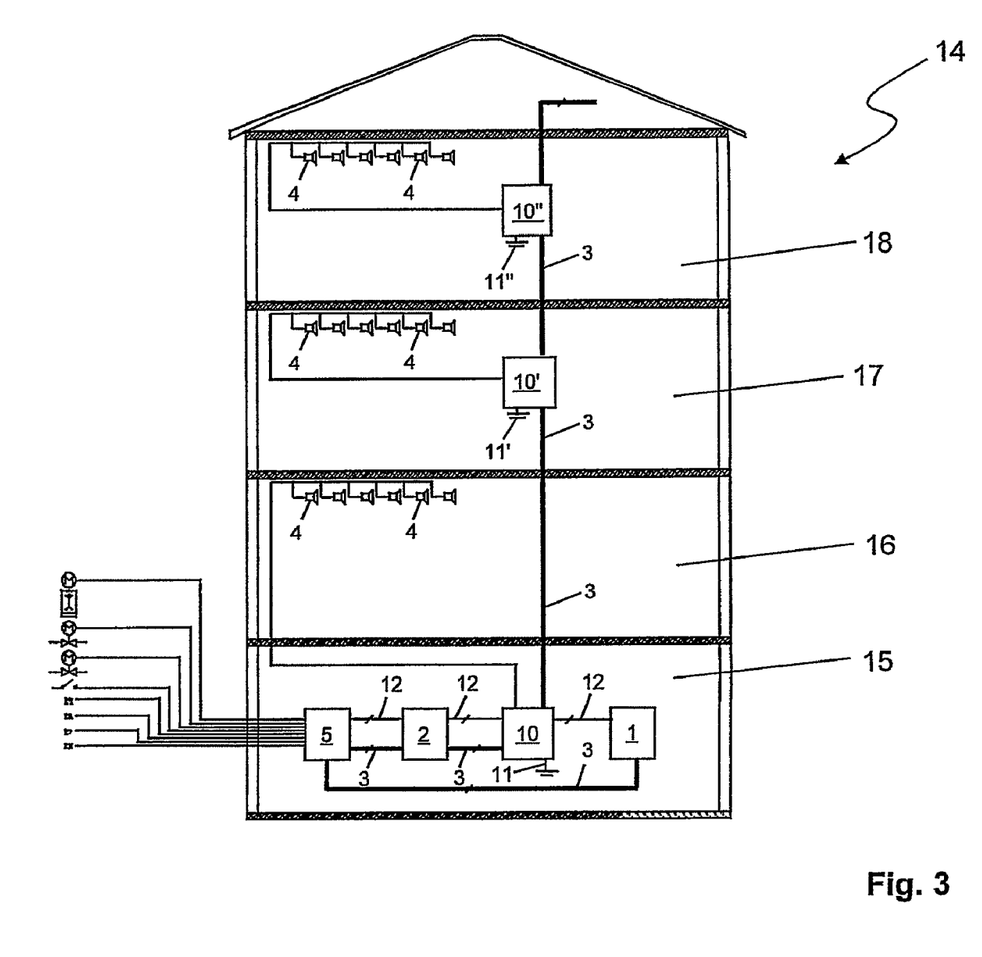
FIG. 3 use of the earthquake alert system according to the invention for monitoring a high-rise building.

FIG. 3 illustrates monitoring of a high-rise building 14 with the earthquake alert system according to the invention. Two detection units 1 and 2 are placed on the basement floor 15 of the high-rise building 14, which again work in master/slave mode. The detection units are attached to the bearing walls of the building 14, so that ground tremors are recorded directly by the detection units 1 and 2, without distortions. Furthermore, a building technology unit 5 is provided, which fulfills the functions described above with reference to FIG. 2. The power supply of the components of the earthquake alert system takes place by way of a power supply unit 10, which is also located on the basement floor 15 of the high-rise building 14. The detection units 1, 2, the building technology unit 5, and the power supply unit 10 are connected with one another by way of a data bus 3 as well as by way of a power supply line 12. Alarm sirens 4 are disposed on the ground floor 16, as well as in the upper floors 17 and 18 of the building 14, in each instance; these generate acoustical alarm signals that can be perceived by persons in the building 14, in case of an earthquake alert. The sirens 4 located on the ground floor 16 are directly connected with the power supply unit 10 situated in the basement 15. Separate power supply units 10' and 10", respectively, are provided for the sirens 4 on the upper floors 17 and 18, respectively. The alarm sirens 4 are activated on all the floors by way of the data bus 3 that is guided to the floors 16, 17, and 18, with which the power supply units 10, 10', and 10" are connected, whereby the alarm is controlled by the detection unit 2 in the basement 15 of the building 14, which is being operated in master mode. The power supply units 10, 10', and 10" have a network connection 11, 11', and 11", respectively.

Figure 4:
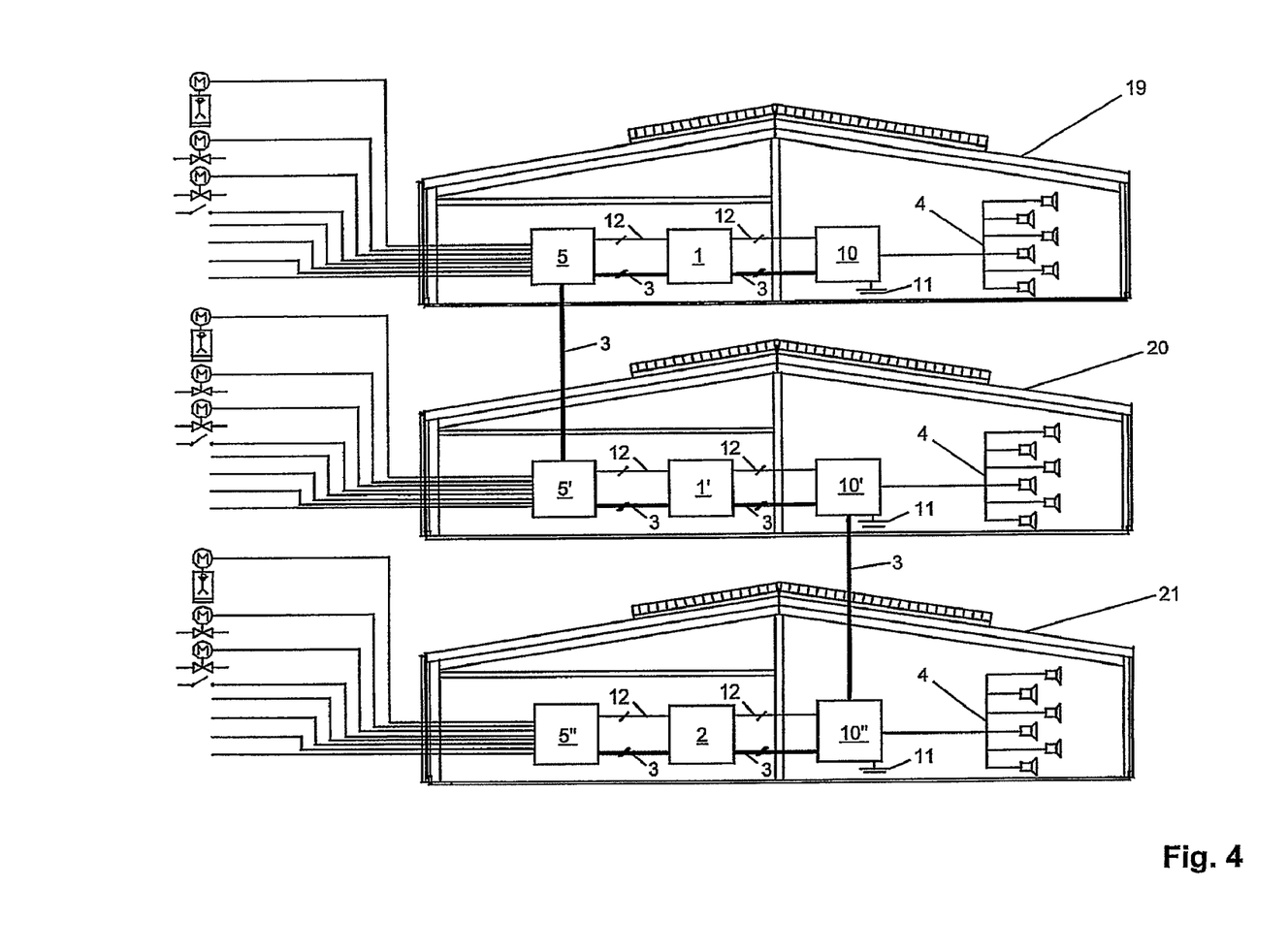
FIG. 4 industrial building complex with earthquake alert system according to the invention.

FIG. 4 shows the earthquake alert system according to the invention for monitoring a building complex that consists of three industrial halls 19, 20, and 21. There is a detection unit 1, 1' or 2, respectively, in each of the halls 19, 20, and 21, respectively. These are connected with one another by way of a data bus 3. The buildings 19, 20, and 21 are connected with one another by way of the data bus 3. Again, the detection units 1, 1', and 2 are used in master/slave mode. The detection units 1 and 1' are being operated in slave mode, while the detection unit 2 is being operated in master mode. The detection unit 2, which is being operated in master mode, cyclically queries the detection units 1 and 1' by way of the data bus 3. An alarm is given if all the detection units 1, 1', and 2 detect the P wave of an earthquake, with time correlation, by means of analysis of the recorded ground tremor signals. A building technology unit 5, 5', and 5", respectively, is provided for each building 19, 20, and 21, in each instance. These fulfill the functions for the building in question, as already described above. Each building 19, 20, and 21 is equipped with its own power supply unit 10, 10', or 10", respectively, to provide power to the components of the system, in each instance. The alarm sirens 4 are connected with the power supply units 10, 10', and 10".

That which is claimed is:

1. Earthquake alert system having two or more sensors for detecting tremor signals, and having means for electrical signal processing for processing and analyzing the tremor signals, comprising:
   (i) at least two detection units that each have a tremor sensor for detecting tremor signals and an electronic signal processing means for processing and analyzing the tremor signals, in each instance, wherein the signal processing means of each detection unit is configured to detect primary waves of earthquakes on the basis of a signal received from the tremor sensor and to calculate characteristic variables from detected primary waves and compare the calculated characteristic variables with threshold values, the characteristic variables being a measure of the destructive effect of subsequent secondary waves;

(ii) an electronic data bus operatively connecting the detection units with one another, wherein the detection units communicate with one another in master/slave mode, by way of the data bus, such that a detection unit being operated in master mode periodically queries the detection units being operated in slave mode; and (iii) an alarm configured for activation as a function of the result of the comparison between the characteristic variables and the threshold values, wherein the detection unit operated in master mode is configured to activate the alarm only if the signal processing means of at least two detection units detect a primary wave, with time correlation.

2. Earthquake alert system according to claim 1, wherein the electronic data bus is configured at least partially as a wireless connection.

3. Earthquake alert system according to claim 1, wherein the alarm can be activated separately by the detection units and by way of the data bus.

4. Earthquake alert system according to claim 1, further comprising at least one building technology unit connected with the data bus, wherein the at least one building technology unit controls at least some components of the building technology of a building being monitored by means of the earthquake alert system.

5. Earthquake alert system according to claim 4, wherein the signal processing means of the detection units are configured to detect secondary waves of earthquakes on the basis of the signals of the tremor sensors, wherein at least some components of the building technology can be controlled as a function of the detection of secondary waves.

6. Earthquake alert system according to claim 1, further comprising at least one power supply unit, said at least one power supply unit providing the individual components of the system with electrical power.

7. Earthquake alert system according to claim 6, wherein the power supply unit comprises a battery or a rechargeable battery for providing the system with emergency power, independent of the power network.

8. Earthquake alert system according to one of claims 6 or 7, wherein the power supply unit has connectors for optical and/or acoustical alarms.

9. Earthquake alert system according to claims 1, further comprising a memory unit connected with the data bus for storing the signals of the tremor sensors.

10. Earthquake alert system according to claim 1, further comprising a remote data communication unit for data communication between spatially remote earthquake alarm systems.

11. Earthquake alert system according to claim 1, further comprising at least one operating unit connected with the data bus, said operating unit including operating and display elements for controlling the detection units and for querying and displaying the operating state of the system.

12. Earthquake alert system, comprising:

(i) at least two detection units, including a first detection unit and a second detection unit, comprising a tremor sensor for detecting tremor signals and an electronic signal processing means for processing and analyzing tremor signals, in each instance, wherein the signal processing means of each detection unit is configured to detect primary waves of earthquakes on the basis of a signal received from the tremor sensor and to calculate characteristic variables from detected primary waves and compare the calculated characteristic variables with threshold values, the characteristic variables being a measure of the destructive effect of subsequent secondary waves; and (ii) an electronic data bus operatively connecting the detection units with one another, wherein the detection units communicate with one another in master/slave mode, by way of the data bus, such that said first detection unit being operated in master mode periodically queries the detection units, including the second detection unit, being operated in slave mode; and (iii) an alarm configured for activation as a function of the result of the comparison between characteristic variables and the threshold values, wherein, said first detection unit is configured to activate the alarm only if the signal processing means of at least two detection units detect a primary wave, with time correlation, wherein at least said second detection unit being configured to automatically assume the function of master mode upon the failure or loss of connection to the electronic data bus by the first detection unit.

* * * * *

UNITED STATES PATENT AND TRADEMARK OFFICE
CERTIFICATE OF CORRECTION

| | | |
|---|---|---|
| PATENT NO. | : 7,598,884 B2 | Page 1 of 1 |
| APPLICATION NO. | : 11/753202 | |
| DATED | : October 6, 2009 | |
| INVENTOR(S) | : Lachenit et al. | |

It is certified that error appears in the above-identified patent and that said Letters Patent is hereby corrected as shown below:

Title page,

Item (76), Inventors, "Albert-Enstein" should read --Albert-Einstein--.

Item (30), Foreign Application Priority Data, "202004018276" should read --202004018276.9--.

Column 1,

Line 63, "Modem" should read --Modern--.

Column 10,

Line 4, "claims 1" should read --claim 1--.

Signed and Sealed this

Twentieth Day of April, 2010

David J. Kappos
*Director of the United States Patent and Trademark Office*